S. C. FORGY.
KITCHEN CABINET.
APPLICATION FILED JAN. 27, 1913.
1,066,006.
Patented July 1, 1913.
2 SHEETS—SHEET 1.
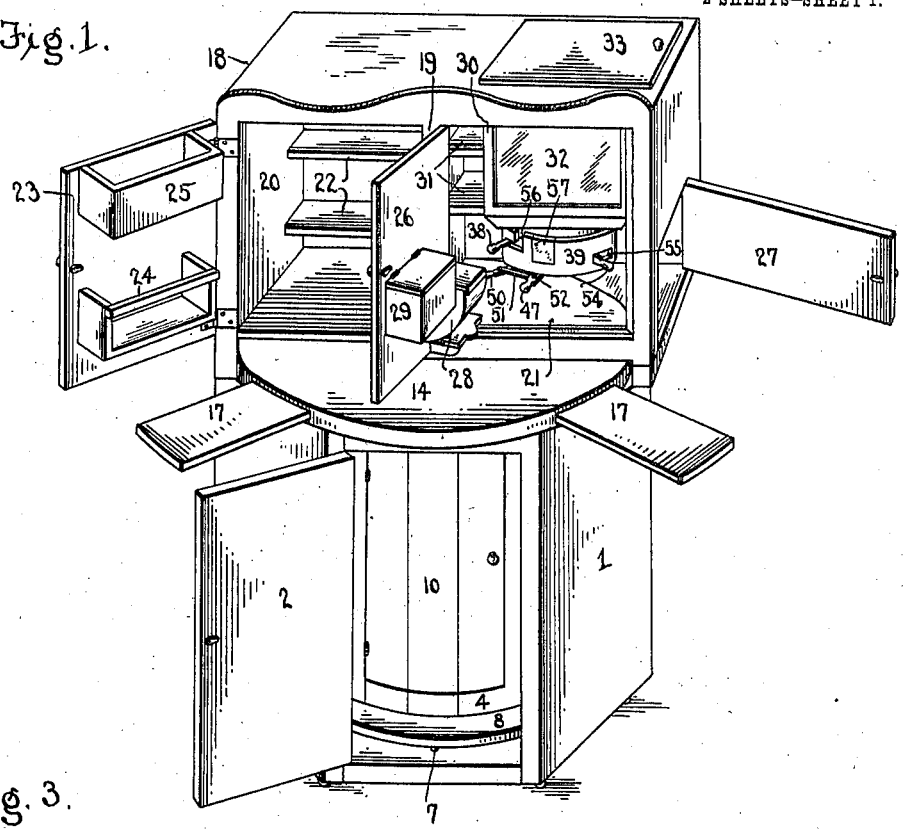
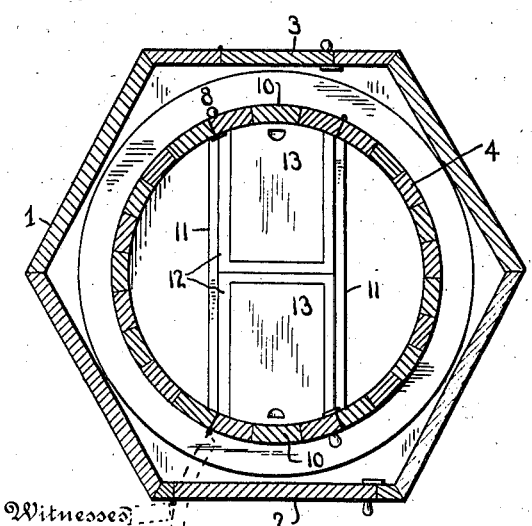
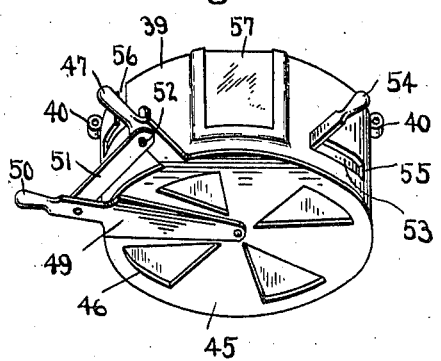
Witnesses:
L. B. James
C. E. Hunt
Inventor
S. C. Forgy
By H. B. Willson & Co.
Attorneys.

S. C. FORGY.
KITCHEN CABINET.
APPLICATION FILED JAN. 27, 1913.
1,066,006.
Patented July 1, 1913.
2 SHEETS—SHEET 2.
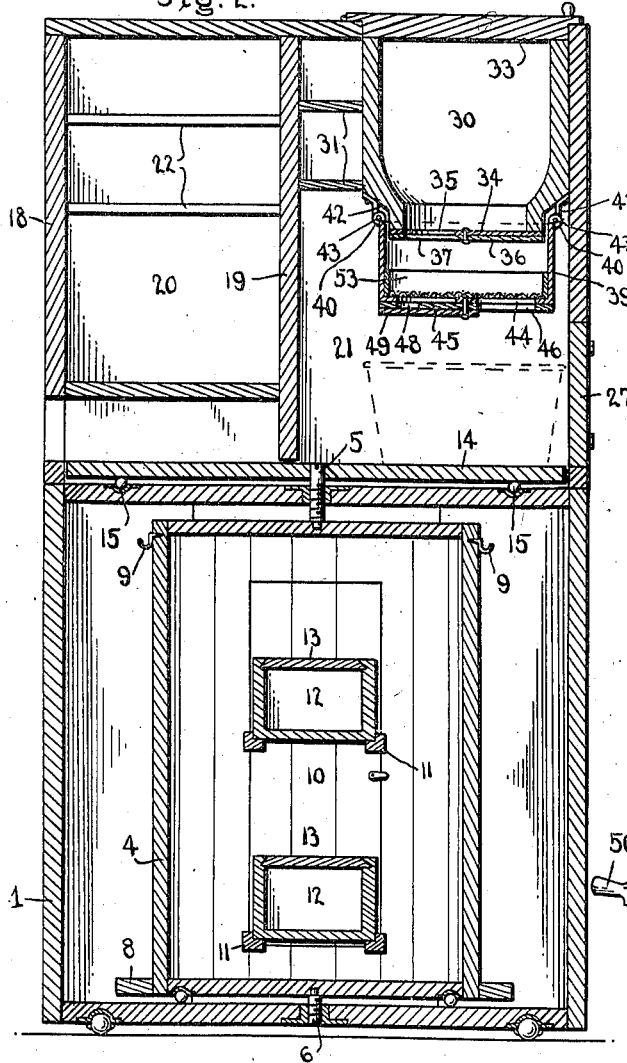
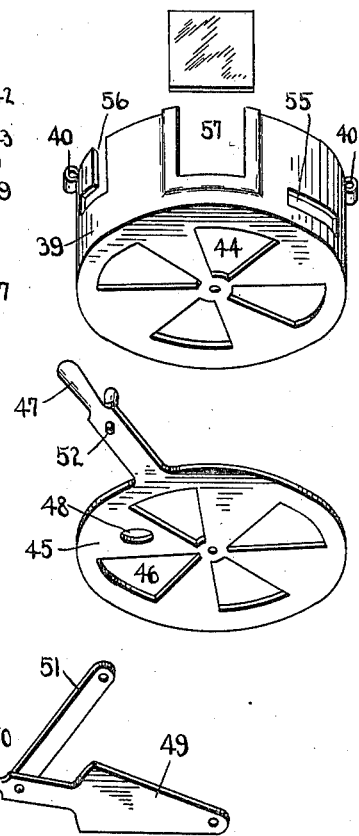
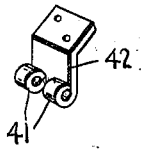
Witnesses
L. B. James
C. E. Hunt
Inventor
S. C. Forgy
By H. B. Willson & Co.
Attorneys

UNITED STATES PATENT OFFICE.

SHERMAN CLYDE FORGY, OF VANDALIA, MISSOURI.

KITCHEN-CABINET.

1,066,006.  Specification of Letters Patent.  Patented July 1, 1913.

Application filed January 27, 1913. Serial No. 744,516.

*To all whom it may concern:*

Be it known that I, SHERMAN CLYDE FORGY, a citizen of the United States, residing at Vandalia, in the county of Audrain and State of Missouri, have invented certain new and useful Improvements in Kitchen-Cabinets; and I do declare the following to be a full, clear, and exact description of the invention, such as will enable others skilled in the art to which it appertains to make and use the same.

This invention relates to improvements in kitchen cabinets.

One object of the invention is to provide a kitchen cabinet having arranged therein numerous compartments, shelves and receptacles adapted to contain provisions, culinary articles and the like, whereby these goods and articles may be kept in a sanitary condition and in convenient position for use.

Another object is to provide a cabinet of this character having an improved construction and arrangement of flour bin and sifting mechanism and means for regulating and cutting off the discharge of the flour from the bin to the sifter and from the sifter to the receptacle provided to receive the sifted flour.

With these and other objects in view, the invention consists of certain novel features of construction, and the combination and arrangement of parts as will be more fully described and claimed.

In the accompanying drawings, Figure 1 is a perspective view of my improved kitchen cabinet with the doors of the various compartments open to illustrate the interior arrangement thereof; Fig. 2 is a vertical cross sectional view of the cabinet; Fig. 3 is a horizontal section of the base member of the cabinet; Fig. 4 is a detail perspective view of the removable sifter receptacle of the flour bin; Fig. 5 is a similar view of the sifter receptacle showing the parts of the latter separated; Fig. 6 is an enlarged vertical sectional view through a portion of the rotary top or shelf disposed between the upper and lower members of the cabinet illustrating the arrangement of one of the bread boards carried thereby; Fig. 7 is a detail perspective view of one of the hangers to which the sifter receptacle is detachably secured.

My improved kitchen cabinet comprises a hollow base 1 which may be of any suitable shape and which is here shown as being hexagonal. In the front side of the base 1 is arranged a main door 2 while in the rear side thereof is a small door 3 through which any articles falling in the back of the base may be readily removed. Revolubly mounted in the hollow base 1 is a cylindrical case 4 which is held centrally in the base 1 by upper and lower bearing studs 5 and 6 arranged in the top and bottom of the base as clearly shown in Fig. 2 of the drawings. The case 4 is revolubly supported on the bottom of the base 1 by suitably arranged ball bearings 7. Secured to the sides of the case at the lower end thereof is an annular radially projecting shelf 8 on which small articles may be placed, and around the upper portion of the case are arranged hooks 9 on which small articles may be hung.

In the opposite sides of the case at diametrically opposite points are arranged doors 10 and arranged through the case in line with the doors are upper and lower pairs of drawer guiding and supporting bars 11 on which are slidably mounted drawers 12 which are in the form of boxes having covers 13 and which are provided to contain bread, cake or similar goods. Two drawers 12 are preferably provided for each set of supporting bars 11 and said drawers are arranged to be drawn out through the doors in the opposite sides of the case 4 as clearly indicated in Fig. 3 of the drawings. By revolubly mounting the case 4 in the base 1 in the manner described it will be seen that when the main door of the base is opened, the case 4 may be revolved to bring either of the doors 10 therein opposite to the door 2 in the base, thus permitting the door in the case to be open and the drawers in this side of the case drawn out of the base.

Revolubly mounted on the upwardly projecting end of the upper bearing stud 5 in the base 1 is a circular shelf or supplemental top 14 which is revolubly supported on the main top of the base 1 by bearing balls 15 as shown. In the supplemental top 14 are arranged radially disposed recesses 16 in which are slidably mounted bread or pastry boards 17, which when the supplemental top 14 is revolved to the proper position may be drawn outwardly from the recesses 16 as clearly indicated in Fig. 1 of the drawings.

The top or upper portion 18 of the cabinet is supported on the top of the rear portion of the base and said top or upper portion extends substantially half-way across the revolubly mounted supplemental top 14, the bottom of the upper portion of the cabinet being recessed to receive the revolving supplemental top which revolves beneath the upper portion of the cabinet as shown. The upper portion of the cabinet is divided by a vertical partition 19 into two main compartments 20 and 21. The compartment 20 has arranged therein shelves 22 and is provided with a door 23 which closes the outer side thereof and on the inner side of the door is arranged a rack 24 and a box 25 adapted to contain any article which it may be desired to place therein. The compartment 21 is also provided with a front door 26 and has in addition thereto a small side door 27, the purpose of which will be hereinafter described. On the inner side of the front door 26 is arranged a sugar bin 28 having a self-feeding hopper and a covered box 29 adapted to contain any goods it is desired to place therein. Arranged in the compartment 21 is a large flour bin 30 between which and the partition 19 are arranged shelves 31. The bin 30 has in its front side a transparent panel 32 through which the contents of the bin may be observed. The upper end of the bin 30 communicates with an opening in the top of the upper portion of the cabinet, said opening being closed by a tight fitting cover 33 which also forms the top of the flour bin.

The bottom 34 of the flour bin has formed therein a series of radially disposed discharge openings 35 which are adapted to be covered and uncovered by a valve plate 36 pivotally secured to the center of the bottom 34 by a centrally disposed pivot pin and in which is also arranged a series of radially disposed discharge openings 37 which, when the valve plate 36 is turned are adapted to be brought into and out of register with the openings 35 in the bottom of the bin thereby opening and closing said openings to permit the discharge of the desired quantity of flour from the bin. The valve plate 36 is provided with a radially projecting handle 38 by means of which the plate may be turned in the desired direction.

Arranged beneath and detachably secured to the lower or discharge end of the flour bin is a sifter supporting tray 39 having at diametrically opposite points on its upper edges eyes 40 which are adapted to be engaged between parallel eyes 41 formed on supporting plates 42 secured to the opposite sides of the lower end of the flour bin as shown. With the engaging eyes 40 and 41 of the tray and supporting plates are engaged pins 43 whereby these parts are detachably connected to support the tray. In the bottom of the tray 39 are formed annular series of discharge openings 44 and arranged beneath and pivotally connected to the bottom of the tray is a circular valve plate 45 in which is also formed a series of radially disposed discharge openings 46 which, when the plate 45 is turned are adapted to be brought beneath the openings 44 in the bottom of the tray whereby the latter are uncovered to a greater or less extent to permit the discharge of the flour from the tray.

The valve plate 45 is provided on one side with a radially projecting handle 47 whereby the plate may be readily turned. Also formed in the valve plate 45 between two of the openings 46 therein is a small discharge opening 48 which is adapted to be covered and uncovered by a plate 49 having on its outer end a handle 50 and having its inner end pivotally supported by the pivot pin of the plate 45. By providing the discharge opening 48 a small quantity of flour may be discharged from the tray 39 when the main discharge openings thereof are closed. The valve plate 49 is normally held in position to close the small discharge opening 48 by a link 51 which is pivotally connected to the handle 50 of the plate 49 and is adapted to be detachably connected to the handle 47 of the plate 45 by a pin 52 which is engaged with apertures formed in the end of the link and in the handle 47 as shown. When the valve plate 49 is thus fastened to the valve plate 45 these parts turn together when the plate 45 is operated, and the small discharge opening 48 remains closed. When it is desired to move the valve plate 49 independently of the valve plate 45 to uncover the small opening 48 it is first necessary to remove the pin 52 and thus disconnect the handle of the plate 49 from the handle of the plate 45.

Arranged in the tray 39 and loosely supported on the apertured bottom thereof is a circular flour sifter 53 into which the flour is discharged from the openings in the bottom of the flour bin when said openings are uncovered by the valve plate 36. The sifter 53 is oscillated or agitated in the tray 39 by a handle 54 secured at its inner end to the sifter and projecting through a slot 55 in one side of the tray in position to be grasped and operated through the opening in the side of the cabinet which is closed by the side door 27 hereinbefore described. The flour when thus sifted falls into the tray and is discharged therefrom through the openings therein into a bowl or other receptacle placed in the upper portion of the cabinet beneath the tray as indicated in dotted lines in Fig. 2 of the drawings. The tray 39 has also formed in the side thereof and opening through its upper end a right angular slot 56 through which projects the handle of the valve plate 36 which covers and uncovers the discharge openings in the bottom of the bin. The tray is also provided in one side with a view opening which is covered by a transparent panel 57 whereby the discharge of the flour from the bin into the sifter may be observed.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

1. A kitchen cabinet including a flour bin, a tray over its outlet end provided with discharge openings, a valve plate having main openings adapted to register with those in the tray and a supplemental opening, a supplemental valve plate movably connected with the main valve plate and adapted to cover said supplemental opening, handles on said plates, a link connected with the handle of the supplemental plate, the other handle and the link having holes adapted to register when the supplemental opening is closed, and a pin removably engaging said holes at that line, for the purpose set forth.

2. A kitchen cabinet comprising a base, an upper member arranged thereon and having therein series of compartments, a flour bin arranged in one of said compartments and having in its lower end discharge openings, a valve plate to cover and uncover said openings, a tray detachably connected to the discharge end of said bin and having therein discharge openings, a main valve plate having therein series of main discharge openings and a small supplemental discharge opening adapted to be brought into register with the discharge openings in the bottom of the bin whereby the flour is discharged therefrom, a valve plate adapted to cover and uncover the small supplemental discharge opening in said main valve plate, handles formed on said valve plates, means to detachably connect said valve plates whereby they may be moved in unison and whereby the valve plate of said small discharge opening may be moved independently of the main valve plate, and a sifter arranged in said tray and adapted to be operated to sift the flour discharged from the bin.

3. A kitchen cabinet comprising a hollow base, a case revolubly mounted in said base, a series of closed drawers slidably mounted in said case, doors arranged in the latter and adapted to be opened to permit the removal of said drawers, a shelf and a series of hooks arranged on said case, doors arranged in said base to provide access thereto and to said case, a supplemental top revolubly mounted on said base, bread and pastry boards carried by said revolving top and adapted to be drawn outwardly therefrom to operative positions, an upper member supported on said base and having therein compartments, doors to open and close said compartments, receptacles carried by said doors, shelves arranged in said compartments and a flour bin also arranged in one of said compartments.

In testimony whereof I have hereunto set my hand in presence of two subscribing witnesses.

SHERMAN CLYDE FORGY.

Witnesses:
   E. C. SIMON,
   GUY McCUNE.